United States Patent
Ma et al.

(10) Patent No.: US 12,549,930 B2
(45) Date of Patent: Feb. 10, 2026

(54) IN-FLIGHT ENTERTAINMENT SYSTEMS WITH BLUETOOTH CONTROLLER FOR MITIGATING BLUETOOTH TRANSMITTER INTERFERENCE

(71) Applicant: Thales Avionics, Inc., Irvine, CA (US)

(72) Inventors: Jueren Ma, Placentia, CA (US); Raghunath Gunti, Irvine, CA (US); Shivam Patel, Anaheim, CA (US)

(73) Assignee: Thales Avionics, Inc., Irvine, CA (US)

( * ) Notice: Subject to any disclaimer, the term of this patent is extended or adjusted under 35 U.S.C. 154(b) by 403 days.

(21) Appl. No.: 18/116,359

(22) Filed: Mar. 2, 2023

(65) Prior Publication Data

US 2024/0298153 A1 Sep. 5, 2024

(51) Int. Cl.
| | |
|---|---|
| *H04W 4/42* | (2018.01) |
| *H04W 4/021* | (2018.01) |
| *H04W 4/80* | (2018.01) |
| *H04W 24/08* | (2009.01) |
| *H04W 76/38* | (2018.01) |

(52) U.S. Cl.
CPC ............ *H04W 4/42* (2018.02); *H04W 4/021* (2013.01); *H04W 4/80* (2018.02); *H04W 24/08* (2013.01); *H04W 76/38* (2018.02)

(58) Field of Classification Search
CPC ......... H04W 4/80; H04W 4/021; H04W 4/42; H04W 76/38; H04W 24/08
See application file for complete search history.

(56) References Cited

U.S. PATENT DOCUMENTS

| | | | |
|---|---|---|---|
| 10,313,982 | B1 | 6/2019 | Rabii et al. |
| 10,616,741 | B2 | 4/2020 | Rabii et al. |
| 10,736,052 | B2 * | 8/2020 | Rabii ................. H04W 52/243 |
| 2014/0315593 | A1 | 10/2014 | Vrzic et al. |
| 2023/0147344 | A1 * | 5/2023 | Malhotra ............. H04W 52/50 455/522 |

\* cited by examiner

*Primary Examiner* — Tuan H Nguyen
(74) *Attorney, Agent, or Firm* — Sage Patent Group (57) ABSTRACT

An in-flight entertainment system includes a centralized Bluetooth radio manager that is communicatively connected to Bluetooth radios located with seat video display units (SVDU) at passenger seats within an aircraft cabin. The centralized Bluetooth radio manager includes a network interface that communicates with the Bluetooth radios through an aircraft cabin network, a processor coupled to the network interface, and a memory coupled to the processor and storing instructions that when executed by the processor causes the processor to perform operations. The operations include to determine a level of radiated power by the Bluetooth radios having active Bluetooth connections with passenger devices. The operations further control at least one group of the Bluetooth radios to prevent establishment of new Bluetooth connections between the group of Bluetooth radios and other passenger devices responsive to the determined level of radiated power satisfying a remedial action rule related to excessive Bluetooth interference.

23 Claims, 5 Drawing Sheets

IN-FLIGHT ENTERTAINMENT SYSTEMS WITH BLUETOOTH CONTROLLER FOR MITIGATING BLUETOOTH TRANSMITTER INTERFERENCE

FIELD OF THE INVENTION

The present disclosure relates to aircraft-based in-flight entertainment systems that communicate with mobile terminals using Bluetooth radio transmitters.

BACKGROUND

Radio interference in aircraft cabins is becoming a growing concern due to the increasing number of radio transmitters present in the cabin. With the rise of technology and the widespread use of personal electronic devices, there are now many sources of radio frequency (RF) signals in an aircraft cabin, such as seat video display units having Bluetooth radios, passenger electronic devices having both Bluetooth and WiFi radios, WiFi access points, and other wireless communication devices.

The proliferation of such wireless devices operating simultaneously, usually within the industrial, scientific and medical (ISM) radio band, and with unsynchronized use of the radio resources, can result in levels of communication interference that degrade or intermittently prevent device communications and may interfere with the functioning of other electronic systems or components in the aircraft. Radio transceivers are typically programmed to respond to degradation of their communication link quality by increasing their transmission power level. However, these operations can result in a rapid escalation of the signal noise floor within the cabin and further increase levels of communication interference and degraded/interrupted device operation.

SUMMARY

Some embodiments of the present disclosure are directed to a vehicle entertainment system, which can be an in-flight entertainment system. The system includes a centralized Bluetooth radio manager that is communicatively connected to Bluetooth radios located with seat video display units (SVDU) at passenger seats within a vehicle cabin. The centralized Bluetooth radio manager includes a network interface that communicates with the Bluetooth radios through a vehicle cabin network, a processor coupled to the network interface, and a memory coupled to the processor and storing instructions that when executed by the processor causes the processor to perform operations. The operations include to determine a level of radiated power by the Bluetooth radios having active Bluetooth connections with passenger devices. The operations further control at least one group of the Bluetooth radios to prevent establishment of new Bluetooth connections between the group of Bluetooth radios and other passenger devices responsive to the determined level of radiated power satisfying a remedial action rule related to excessive Bluetooth interference.

In some further embodiments, the operations prevent establishment of new Bluetooth connections by controlling the Bluetooth radios to prevent completion of a pairing process with other (non-connected) passenger devices and/or by controlling the Bluetooth radios to cease periodic transmission of Bluetooth advertising packets containing an identifier of the Bluetooth radio in order to interfere with discovery of the Bluetooth radio by passenger devices.

The operations to decide how to control Bluetooth connections and/or to whether to terminate Bluetooth connections when needed to prevent excessive Bluetooth interference, may be performed based on a count of active Bluetooth connections in the cabin or a zone of the cabin, types of media traffic (e.g., passenger voice, audio streams to passenger device, gaming data, passenger input to control SVDU, electronic book data, etc.) that is to be or is being communicated through the active Bluetooth connections by respective Bluetooth radios. These operations may alternatively or additionally be performed based on comparison of elapsed Bluetooth connection times of the passenger devices, based on relative priorities associated with the passenger devices, based on which spatial zones the passenger devices are located within, etc.

Still other embodiments are directed to operations for reducing the level of radiated power by reducing bit rates of traffic communicated through selected Bluetooth connections, operations for computing the level of radiated power, operations for grouping Bluetooth radios and for separately controlling the groups of Bluetooth radios based on defined conditions, etc. Other embodiments are directed to allocating Bluetooth channels which are allowed to be used by Bluetooth radios based on a zone dependent channel map, and which may further operate to reduce or increase the number of Bluetooth channels allowed in each zone based on the level of radiated power by the Bluetooth radios in the zone.

Other vehicle entertainment systems, centralized Bluetooth radio managers, methods, and computer program products according to embodiments of the inventive subject matter will be or become apparent to one with skill in the art upon review of the following drawings and detailed description. It is intended that all such additional vehicle entertainment systems, centralized Bluetooth radio managers, methods, and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

An aircraft cabin can have a very high density of Bluetooth radios that are simultaneously using shared frequency resources for communications. The resulting co-channel interference can degrade or preclude wireless communications within the aircraft cabin and may degrade or intermittently prevent operation of the IFE system and/or other aircraft systems or components. Moreover, the Bluetooth radios would normally respond to increasing levels of interference by further increasing their transmission power levels and which, undesirably, further increases the levels of interference and degraded/interrupted device operation.

Various embodiments of the present disclosure are directed to innovative operations and methods for centrally controlling Bluetooth radios to control the level of radiated power in an aircraft cabin.

As will be explained in further detail below, some embodiments are directed to an aircraft inflight entertainment (IFE) system that includes a centralized Bluetooth radio manager which is communicatively connected to Bluetooth radios located with seat video display units (SVDU) at passenger seats within an aircraft cabin. The centralized Bluetooth radio manager operates to determine a level of radiated power by the Bluetooth radios having active Bluetooth connections with passenger devices, and controls the level of radio power by the Bluetooth radios. The Bluetooth radios are configured to transmit and receive radio frequency signals in an unlicensed band, such as the ISM band, and/or in a licensed band.

Although embodiments herein are primarily described in the context of an IFE system deployed onboard an aircraft, the invention is not limited thereto. Instead, these and other related embodiments may be used to control the level of radiated power from Bluetooth radios located in other types of vehicles, including without limitation, trains, automobiles, cruise ships, and buses, and in other non-vehicle installations, including without limitation, hospital rooms (e.g., operating room), meeting rooms, sports stadiums, etc.

As used herein, the term "ISM band" refers to one or more frequency ranges that are reserved internationally for the use of radio frequency energy for unlicensed and/or licensed communications. The term "band" can refer to one continuous frequency range or a plurality of non-continuous frequency ranges that are defined by the ITU Radio Regulations for ISM communications.

Figure 1:
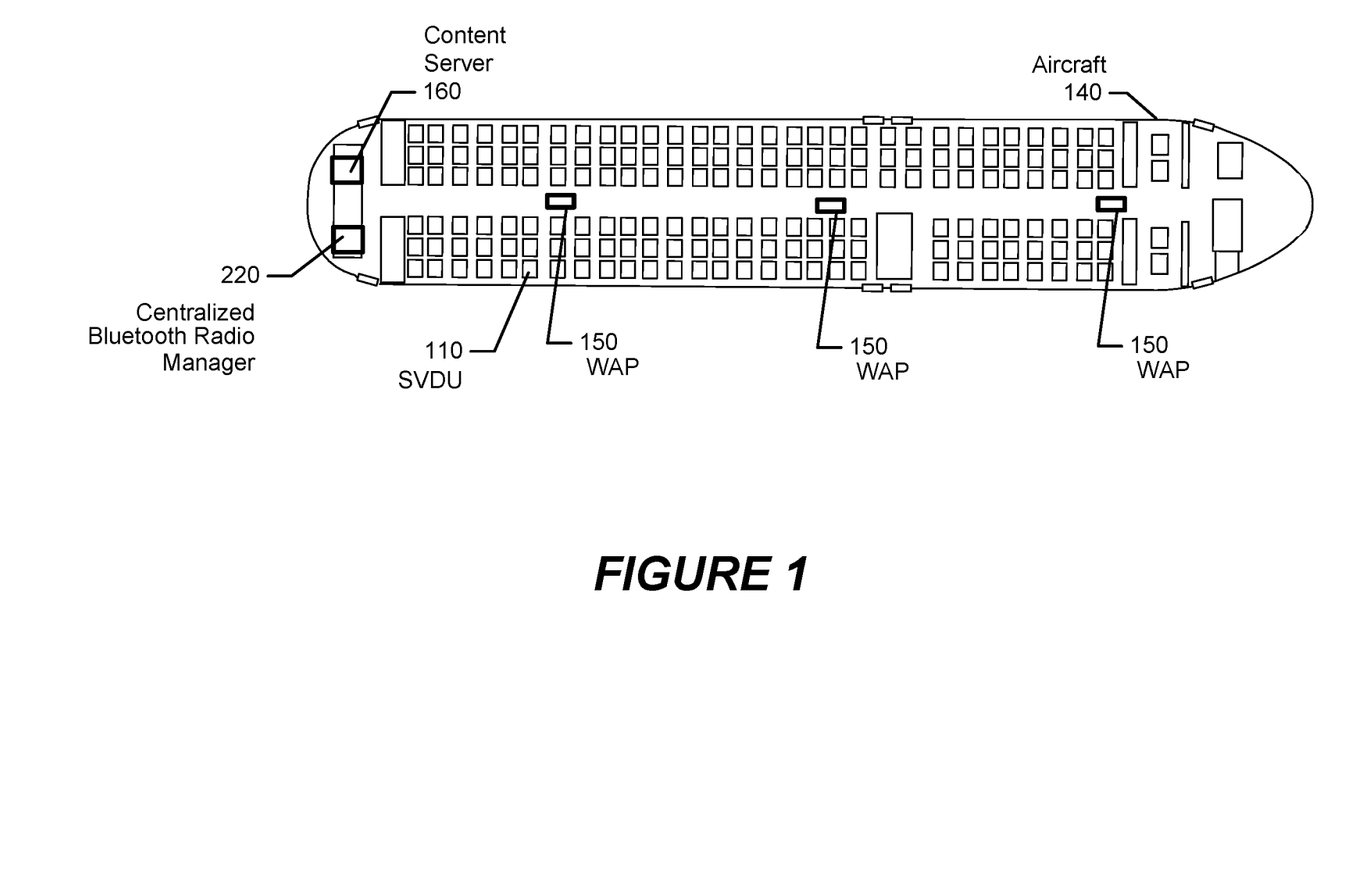
FIG. 1 illustrates an aircraft cabin containing an in-flight entertainment (IFE) system having a content server that streams electronic content through wireless access points (WAPs) and/or a wired network to passenger devices and/or seat video display units (SVDUs), and includes a centralized Bluetooth radio manager configured according to some embodiments of the present disclosure.

FIG. 1 illustrates an aircraft fuselage 140 containing an IFE system that provides entertainment services to passengers. The IFE system can include a content server 160 that streams and/or downloads electronic content through a wired network, e.g., Ethernet, and/or through WiFi radios within wireless access points (WAPs) 150 to other WiFi radios within seat video display units (SVDUs) 110 mounted to structures within the aircraft, including to seatbacks, seat armrests/frames, bulkheads, overhead structures, etc., and to WiFi radios within passenger devices carried on-board by passengers, such as smart phones, tablet computers, laptop computers, etc. The SVDUs 110 may each contain one or more Bluetooth radios that wirelessly communicate through RF signaling with Bluetooth radios within passenger devices and/or passenger data units (PDUs) that may be releasable docked to an armrest docking station and/or a docking station connected to some/all of the SVDUs 110.

When a Bluetooth radio is within a SVDU 110, the Bluetooth radio may be the communication circuitry (i.e., transceiver, signal processor, etc.) which can be incorporated within the same housing that at least partially encloses a display device, video display circuitry, network interface, and other circuitry providing functionality for the SVDU 110. The Bluetooth radios are not necessarily within the SVDUs 110 and may be located elsewhere with a communication connection to electronics driving the SVDUs 110, such as mounted elsewhere in a seat or in a seat box, e.g., located underneath a seat, or in an overhead panel.

The WAPs 150 may also include locally integrated Bluetooth radios, as will be described in further detail below.

In accordance with present embodiments, the IFE system further includes a centralized Bluetooth radio manager 220 that is communicatively connected to the Bluetooth radios located with the SVDUs 110 at passenger seats. The centralized Bluetooth radio manager includes a network interface that communicates with the Bluetooth radios through a vehicle cabin network, a processor coupled to the network interface, and a a memory coupled to the processor and storing instructions that when executed by the processor causes the processor to perform operations. The operations include to determine a level of radiated power by the Bluetooth radios having active Bluetooth connections with passenger devices, and to control at least one group of the Bluetooth radios to prevent establishment of new Bluetooth connections between the group of Bluetooth radios and other passenger devices responsive to the determined level of radiated power satisfying a remedial action rule related to excessive Bluetooth interference.

Figure 2:
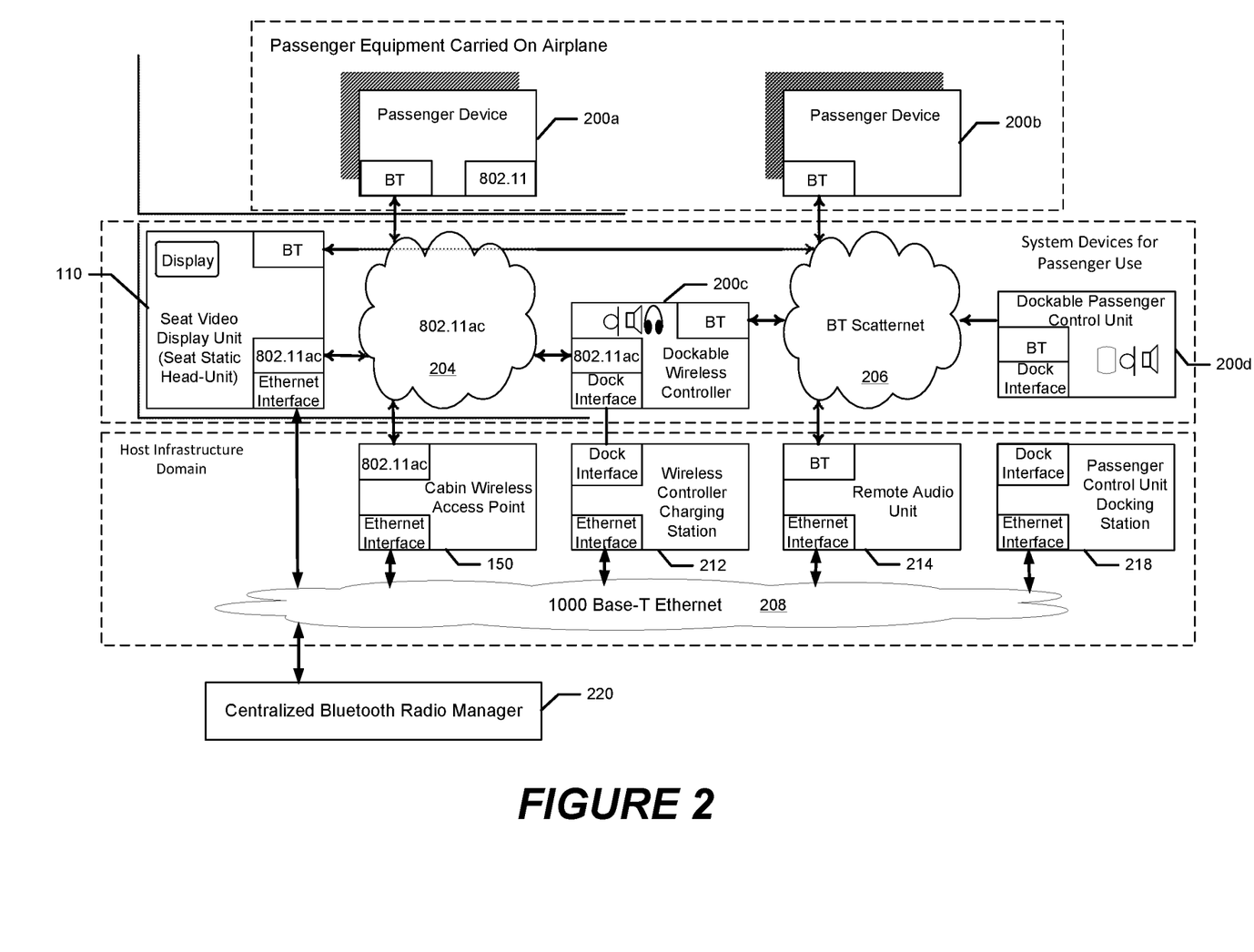
FIG. 2 is a block diagram illustrating the IFE system of FIG. 1 and the centralized Bluetooth radio manager which are configured to operate according to some embodiments of the present disclosure.
Figure 3:
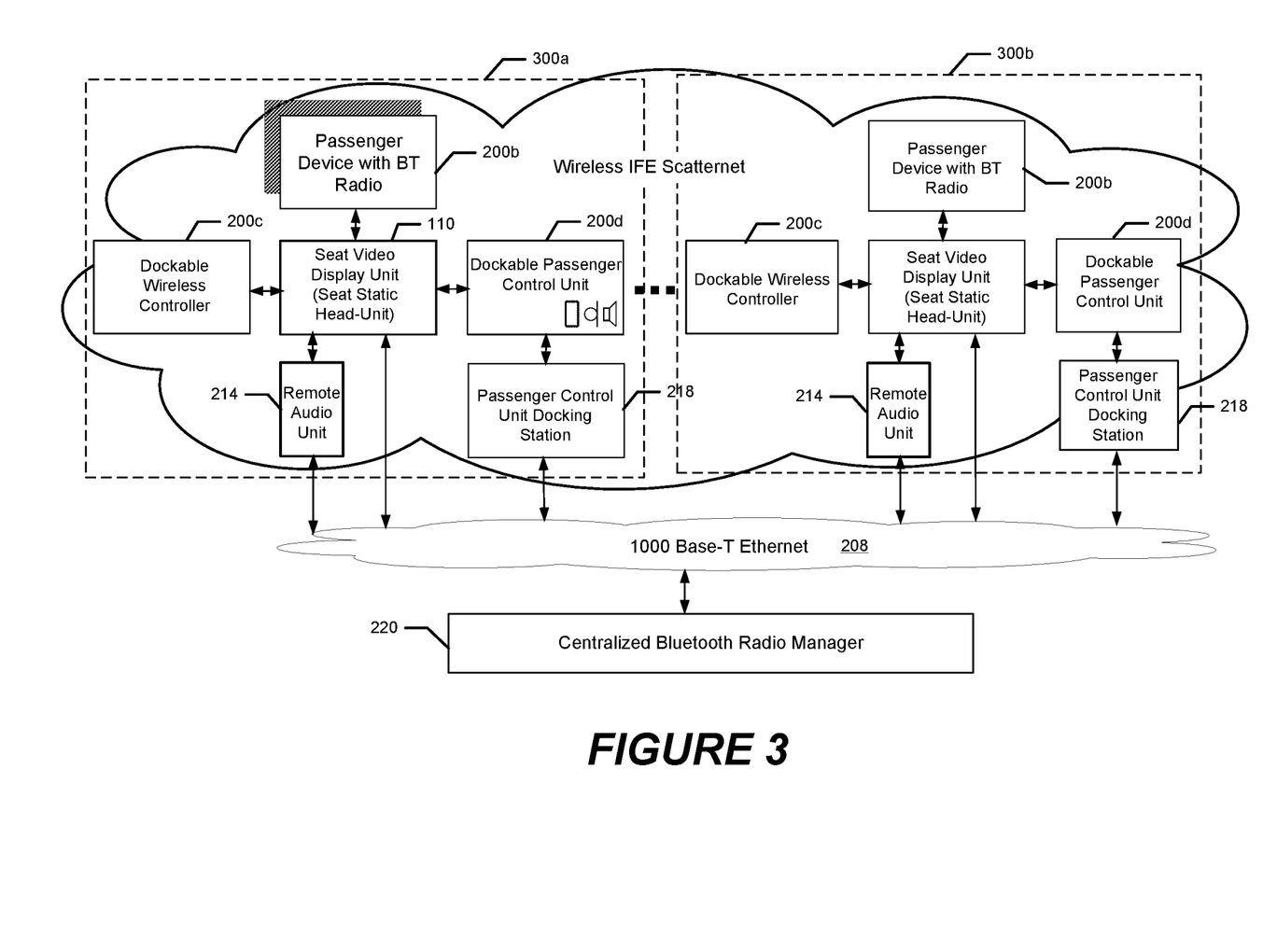
FIG. 3 is another block diagram of the IFE system and the centralized Bluetooth radio manager of FIGS. 1-2 which are configured to operate according to some embodiments of the present disclosure.

Before explaining in detail various operations that can be performed by the centralized Bluetooth radio manager 220 and Bluetooth radios, example IFE systems are explained with regard to FIGS. 2 and 3.

FIG. 2 is a block diagram illustrating the IFE system of FIG. 1 and the centralized Bluetooth radio manager 220 that are configured to operate in accordance with some embodiments of the present disclosure. Referring to FIG. 2, the seat-located Bluetooth radios can communicate with the Bluetooth radios in passenger devices using, e.g., a Bluetooth (BT) scatternet wireless network 206. Similarly, WiFi radios within the SVDUs 110 and/or within the WAPs 150 can communicate with WiFi radios in passenger devices using, e.g., an IEEE 802.11ac wireless network 204. The example passenger devices include a passenger device 200*a* having both a Bluetooth radio and an IEEE 802.11 (WiFi) radio, and include another passenger device 200*b* having a Bluetooth transceiver. The passenger devices may include, but are not limited to, a smart phone, tablet computer, laptop computer, Bluetooth headset, Bluetooth speaker, Bluetooth microphone, game controller, SVDU controller (passenger control unit), etc.

The IFE system includes a SVDU 110, a dockable wireless controller 200c, and a dockable passenger control unit 200d. The example SVDU 110 includes a display device, video display circuitry, a general-purpose processor, a Bluetooth transceiver, an 802.11ac (WiFi) transceiver, and an Ethernet interface or other wired network interface. The dockable wireless controller 200c includes a general-purpose processor, a Bluetooth transceiver, an 802.11ac (WiFi) transceiver, and a dock interface, and may include display circuitry connected to a display device, and audio decoding circuitry connected to a wired headphone jack and/or the Bluetooth transceiver for wireless communication with a passenger's Bluetooth headset. The dockable passenger control unit 200d can similarly include a general-purpose processor, a Bluetooth transceiver, an 802.11ac (WiFi) transceiver, and a dock interface, and may include display circuitry connected to a display device, and audio decoding circuitry connected to a wired headphone jack and/or the Bluetooth transceiver for wireless communication with a passenger's Bluetooth headset. The wireless controller 200c and the passenger control unit 200d may be configured as handheld devices for operation by passengers and/or may be mounted within the seat structure, such as within a seat armrest.

An Ethernet backbone network 208, e.g., 100 Base-T Ethernet, extends throughout the aircraft cabin to communicatively interconnect the seat-located system devices to the content server 160, the wireless access points 150, and the centralized Bluetooth radio manager 220. The wireless access points 150 may each include an 802.11ac or other WiFi radios and an Ethernet interface that connects to the Ethernet backbone network 208.

As will be explained in further detail below, the wireless access points 150 may also include Bluetooth radios that are operable to count of active Bluetooth connections between the seat-based Bluetooth radios and passenger devices, and to report the count to the centralized Bluetooth radio manager 220. Alternatively or additionally, the wireless access points 150 may be operable to measure received signal strength from the Bluetooth radios and report the signal strength measurements to the centralized Bluetooth radio manager 220.

The host infrastructure can include a wireless controller charging station 212, a passenger control unit docking station 218, and a remote audio unit 214. The wireless controller charging station 212 is located at each seat and has a dock interface that releasably stores the dockable wireless controller 200c and charges a battery therein, and has an Ethernet interface that connects to the Ethernet backbone network 208. The passenger control unit docking station 218 is also located at each seat and has a dock interface that releasably stores the dockable passenger control unit 200d and charges a battery therein, and has an Ethernet interface that connects to the Ethernet backbone network 208. The remote audio unit 214 may also be located at each seat or adjacent to a group of seats, and can contain a wired headphone jack, a Bluetooth radio, and an Ethernet interface that connects to the Ethernet backbone network 208, to receive and play audio through a loudspeaker and/or through the Bluetooth radio and/or the wired headphone jack to a headset worn by one or more passengers.

FIG. 3 is another block diagram of the IFE system and the centralized Bluetooth radio manager 220 of FIGS. 1-2 which are configured to operate in accordance with some embodiments of the present disclosure. Referring to FIG. 3, an example configuration of components is illustrated for two spaced apart seat locations 300a and 300b. Each seat location 300a/300b is illustrated as being configured to include a passenger device with Bluetooth radio 200b, a dockable wireless controller 200c, a SVDU 110, a dockable passenger controller unit 200d, a remote audio unit 214, and a passenger control unit docking station 218. These per-seat component configurations can be replicated for any number of seat locations, and one or more of the components that is illustrated as being replicated at each seat location may instead be connected to serve components located at more than one seat location.

In some embodiments, each of the SVDUs 110 may operate using the Bluetooth radios to measure strength of received Bluetooth signals, e.g., in the ISM band, and to report the measurements to the centralized Bluetooth radio manager 220 for use in controlling transmission power levels by the Bluetooth radios. The collection of all SVDUs 110 dispersed along the aircraft cabin thereby form a sensor network that measures strength of RF transmissions throughout the aircraft cabin, and facilitates the centralized Bluetooth radio manager 220 operating to control the transmission power levels of selected ones of the Bluetooth radios, e.g., in defined spatial zones, to cooperatively mitigate communication interference (including RF noise) and/or communication congestion.

Alternatively or additionally, the WAPs 150 may include Bluetooth radios that measure strength of received Bluetooth signals and report the measurements to the centralized Bluetooth radio manager 220 for use in controlling transmission power levels by the Bluetooth radios.

The Bluetooth radios may operate to measure received signal strength (e.g., to generate received signal strength indicator (RSSI) values) and/or estimate channel-state/link-quality (e.g., signal-to-interference-plus-noise ratio (SNIR)) by measuring forward error correction (FEC) and/or cyclic redundancy check (CRC) error rates. The RSSI can be measured as the total received wideband power measured by the receiving Bluetooth radio within a defined bandwidth. The received signal strength may be determined as a linear average of the total received power in the measured bandwidth over a defined number of resource blocks or time periods.

In some other embodiments, the Bluetooth radios located with the SVDUs 110 and/or in the WAPs 150 operate to count active Bluetooth connections between the seat-based Bluetooth radios and passenger devices, and to report the count to the centralized Bluetooth radio manager 220 for use in controlling transmission power levels by the Bluetooth radios.

Figure 4:
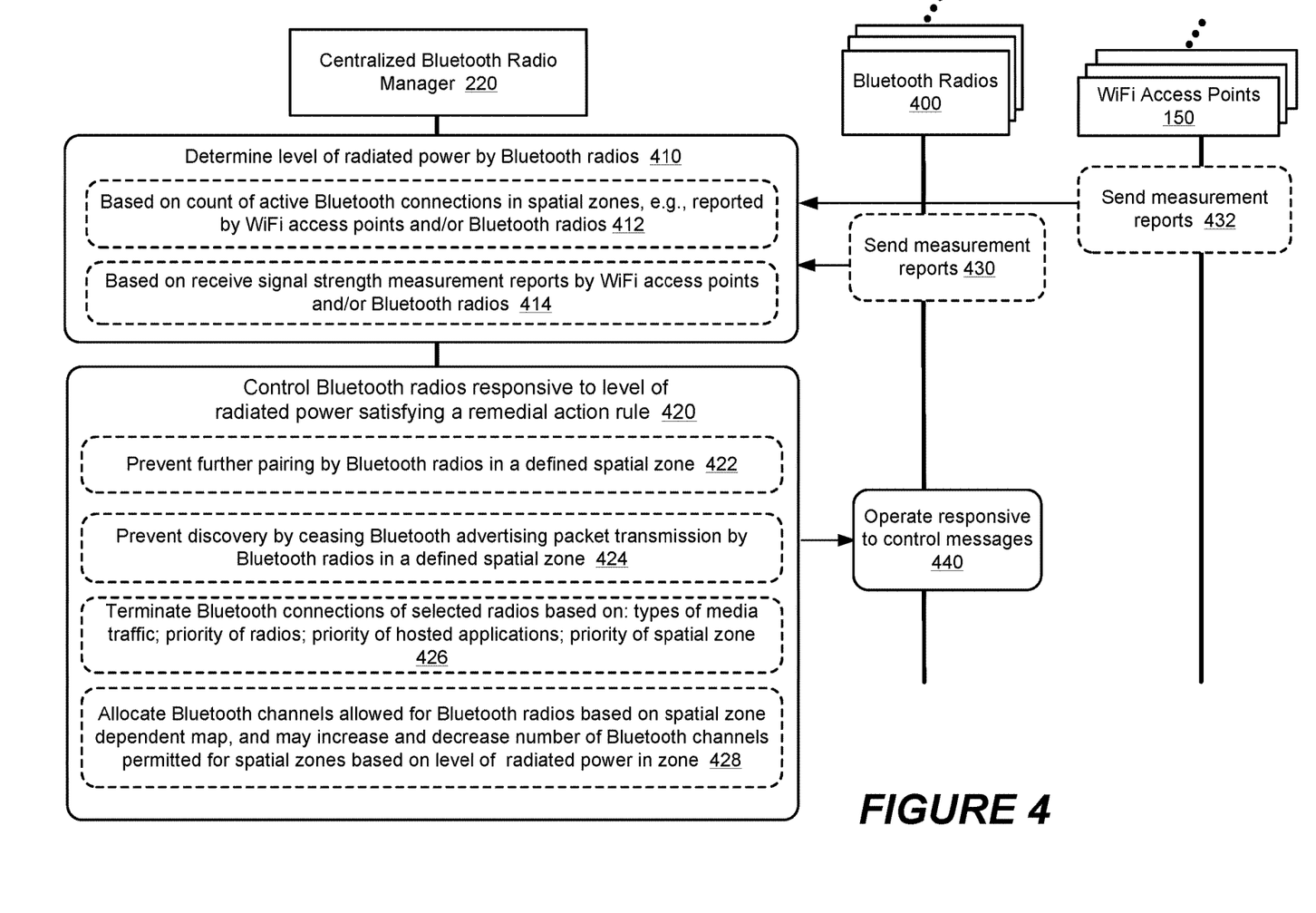
FIG. 4 is a combined flowchart and data flow diagram of operations and methods performed by the centralized Bluetooth radio manager to control radio power from Bluetooth radios according to some embodiments of the present disclosure.

FIG. 4 is a combined flowchart and data flow diagram of operations and methods performed by the centralized Bluetooth radio manager 220 to control radio power from Bluetooth radios in accordance with some embodiments of the present disclosure. Referring to FIG. 4, the centralized Bluetooth radio manager 220 determines 410 a level of radiated power by the Bluetooth radios having active Bluetooth connections with passenger devices.

In one embodiment, the centralized Bluetooth radio manager 220 receives measurement reports which indicate a count of active Bluetooth connections between the Bluetooth radios and passenger devices. The manager 220 then determines 412 the level of radiated power based on the counts indicated by the measurement reports. The WAPs 150 are spaced apart within the vehicle cabin and may include locally integrated Bluetooth radios that operate to count the active Bluetooth connections between the Bluetooth radios 400 located with the SVDUs 110 and passenger devices, and indicate the count in measurement reports sent 432 to the manager 220. Alternatively or additionally, the Bluetooth radios 400 located with the SVDUs 110 may operate to count their respective active Bluetooth connections with passenger devices, and indicate the count in measurement reports sent 430 to the manager 220. A Bluetooth radio 400 located with the SVDUs 110 that reports measurement reports may include a count for itself of locally active Bluetooth connections, and may further operate to include in the count non-locally active Bluetooth connections for one or more other Bluetooth radios. The reporting Bluetooth radio may determine the count for one or more Bluetooth radios which can have Bluetooth connections sensed by the reporting Bluetooth radio and/or may determine the count based on signaling by (e.g., counts indicating in messages sent by) the one or more Bluetooth radios to the reporting Bluetooth radio.

In another embodiment, the centralized Bluetooth radio manager 220 receives measurement reports which indicate measurements of received signal strength by the Bluetooth radios, and then determines 414 the level of radiated power based on an algorithmic combination of the signal strength measurements indicated by the received signal strength measurement reports. The WAPs 150 may include locally integrated Bluetooth radios that measure received signal strength from the Bluetooth radios located with the SVDUs 110, and indicate the measurements in measurement reports sent 432 to the manager 220. Alternatively or additionally, the Bluetooth radios 400 located with the SVDUs 110 may operate to measure received signal strength, and indicate the measurements in measurement reports sent 430 to the manager 220. A Bluetooth radio 400 located with the SVDUs 110 that reports measurement reports may include signal measurements performed on its received and/or transmitted Bluetooth signals, and may further operate to include signal measurements for Bluetooth signals received and/or transmitted by the one or more other Bluetooth radios. For example, the reporting Bluetooth radio may perform measurements of Bluetooth signals from the other Bluetooth radios, or the reporting Bluetooth radios may receive messages from one or more of the other Bluetooth radios which indicate signal strength measurements it/they performed on Bluetooth signaling.

The centralized Bluetooth radio manager 220 controls 420 at least one group of the Bluetooth radios 400 to prevent establishment of new Bluetooth connections between the group of Bluetooth radios and other passenger devices responsive to the determined level of radiated power satisfying a remedial action rule related to excessive Bluetooth interference.

Bluetooth radios may be operationally grouped based on spatial zones in the aircraft cabin, and the centralized Bluetooth radio manager 220 may separately determine whether the remedial action rule is satisfied for individual ones of the zones and responsively control Bluetooth radios in one zone independently from Bluetooth radios in another zone. Spatial zones may correspond to seats located in defined classes (e.g., first, business, premium coach, economy coach, etc.) and/or may corresponds to other groupings of seats, e.g., group seats within a threshold distance of a defined cabin location.

Various operations for controlling the level of radiated power from the Bluetooth radios are now explained and which may be performed individually or in any combination.

Radiated power may be controlled by preventing completion of new Bluetooth connections when the current level of radiated power becomes greater than a threshold value and/or satisfies another condition defined by the remedial action rule. In an example embodiment, the operation to control 420 the Bluetooth radios to prevent establishment of new Bluetooth connections between the between the Bluetooth radios located with the SVDUs and the passenger devices, includes to control one or more of the Bluetooth radios to prevent completion of a pairing process between the Bluetooth radio(s) and passenger devices to prevent establishment of new Bluetooth connections.

Alternatively or additionally, radiated power may be controlled by preventing discovery of the Bluetooth radios when the current level of radiated power becomes greater than a threshold value and/or another condition defined by the remedial action rule. In an example embodiment, the operation to control 420 the Bluetooth radios to prevent establishment of new Bluetooth connections between the Bluetooth radios located with the SVDUs and the passenger devices, includes to control a Bluetooth radio to cease periodic transmission of Bluetooth advertising packets containing an identifier of the Bluetooth radio in order to interfere with discovery by a passenger device of the Bluetooth radio located with a SVDU. Thus, for example, a passenger device which is operating in Bluetooth discovery mode would not receive a Bluetooth advertisement from the Bluetooth radios and would therefore not discover presence of the Bluetooth radios and not attempt to connect.

Other operations may reduce the current level of radiated power by terminating some Bluetooth connections responsive to when the determined level of radiated power is greater than a threshold value and/or another condition defined by the remedial action rule. In an example embodiment, the centralized Bluetooth radio manager 220 responds to the determined level of radiated power for one of the least one group of the Bluetooth radios exceeding a threshold value defined by the remedial action rule, by selecting Bluetooth radios having active Bluetooth connections with passenger devices that are to be terminated, and then controlling the selected Bluetooth radios to terminate their connections with the passenger devices. Thus, the centralized Bluetooth radio manager 220 can select one or more Bluetooth radios based on defined criteria and control those Bluetooth radios to terminate their Bluetooth connections, thereby lowering the level of radiated power in a cabin zone.

The operation to select Bluetooth radios having active Bluetooth connections with passenger devices that are to be terminated, may include to determine types of media traffic communicated through the active Bluetooth connections by respective Bluetooth radios. The operations may then select the Bluetooth radios which are determined to be communicating a type of media traffic having a greater bit rate than another type of media traffic communicated by other Bluetooth radios. For example, the centralized Bluetooth radio manager 220 may select among the Bluetooth radios one or more Bluetooth radios communicating the highest bit rates to have their Bluetooth connections terminated.

Example types of types of media traffic which may be determined and used to select among the Bluetooth radios can include without limitation any one or more of the following:
1) passenger voice;
2) audio streaming from the vehicle entertainment system to the Bluetooth connected passenger device;
3) gaming data communicated from the Bluetooth radio to the Bluetooth connected passenger device;
4) gaming data communicated from the Bluetooth connected passenger device to the Bluetooth radio;

5) passenger input data communicated from the Bluetooth connected passenger device to the Bluetooth radio to control one of the SVDUs; and 6) electronic book data.

The operation to select Bluetooth radios having active Bluetooth connections with passenger devices that are to be terminated, may be based on relative elapsed connection times. For each of the Bluetooth radios, the centralized Bluetooth radio manager 220 may operate to determine an elapsed connection time since establishment of the active Bluetooth connection to a passenger device. The operations can then prioritize the selection of Bluetooth radios, which are to have their active Bluetooth connections terminated, based on the which of the Bluetooth radios have longer elapsed connection times relative to other Bluetooth radios. For example, the centralized Bluetooth radio manager 220 may select among the Bluetooth radios one or more Bluetooth radios which have the greater or greatest elapsed connection times to have their Bluetooth connections terminated.

The operation to select Bluetooth radios having active Bluetooth connections with passenger devices that are to be terminated, may be based on priority of various passenger devices, locations of passenger devices, etc. For each of the Bluetooth radios, the centralized Bluetooth radio manager 220 may determine whether the Bluetooth radio has a Bluetooth connection to a passenger device that is identified as having prioritized Bluetooth access. The centralized Bluetooth radio manager 220 can then prioritize the selection of Bluetooth radios, which are to have their active Bluetooth connections terminated, based on which of the Bluetooth radios are not determined to have prioritized Bluetooth access. For example, the prioritization of individual Bluetooth radios may be based on priority values associated with the SVDU location, e.g., seating class level, priority values associated with the passenger devices which are connected via Bluetooth, and/or priority values associated with identifies of passengers associated with the passenger devices which are connected via Bluetooth.

The operation to select Bluetooth radios having active Bluetooth connections with passenger devices that are to be terminated, may be based on priority of applications, etc. For each of the Bluetooth radios, the centralized Bluetooth radio manager 220 may operate to attempt to identify an application hosted on a passenger device that is Bluetooth connected to the Bluetooth radio and is a source or destination of traffic communicated between the Bluetooth radio and the passenger device. The centralized Bluetooth radio manager 220 can then prioritize the selection of Bluetooth radios, to have their active Bluetooth connections terminated, based on the identified applications hosted on the passenger devices respectively connected to the Bluetooth radios. For example, certain types of applications can have higher prioritization than other types of applications. Applications provided by an airline operator (e.g., application enabling passenger to control SVDU, application enabling passenger to review flight information and/or make or change reservations, etc.) may be prioritized higher than non-airline operator applications.

Other operations that may be performed to reduce the current level of radiated power can include for the centralized Bluetooth radio manager 220 to respond to the determined level of radiated power for one of the least one group of the Bluetooth radios exceeding a threshold value defined by the remedial action rule, by controlling the selected Bluetooth radios to reduce bit rate of traffic communicated through their connections with the passenger devices. Thus, instead of terminating existing Bluetooth connections, the manager 220 may reduce the bit rate bandwidth of one or more selected Bluetooth radios. The operation to reduce bit rate may include instructing an application hosted on the content server 160 and/or the SVDU 110 to reduce the bit rate of data streams or provided to the connected passenger device, and/or instructing an application hosted on the connected passenger device to reduce what bit rate traffic is receives from the Bluetooth radio and/or the bit rate is communicates through traffic to the Bluetooth radio. In one example, the bit rate may be reduced by changing to a lower bit rate audio streaming codec, reducing the bit rate of traffic streamed or sent to a passenger device related to gaming, information, etc.

Some other operations by the centralized Bluetooth radio manager 220 are directed to how Bluetooth radios located with SVDUs 110 can be grouped into zones for purposes of controlling the level of radiated power by the group of Bluetooth radios. Thus, for example, Bluetooth radios in one seating class zone can be grouped and controlled differently than Bluetooth radios another seating class zone, or similarly Bluetooth radios located in a zone near the tail of the aircraft can be grouped and controlled differently than others located in another zone near the middle or front of the aircraft. Different zones may be allowed to have different maximum levels of radiated power.

In one such embodiment, the centralized Bluetooth radio manager 220 identifies groups of the Bluetooth radios based on which Bluetooth radios are located within which of a plurality of spatial zones in the vehicle cabin. The centralized Bluetooth radio manager 220 can then separately control each of the groups of Bluetooth radios based on for each group, determining a level of radiated power collectively by the Bluetooth radios in the group and initiating operation to prevent establishment of new Bluetooth connections between the group of Bluetooth radios and other passenger devices responsive to the result of combining the reported signal strength measurements of the Bluetooth radios in the group satisfying the remedial action rule.

In another embodiment, the Bluetooth radios can be automatically grouped and controlled based on discovering which Bluetooth radios have receive signal strength measurements reported by which of the WAPs. A Bluetooth radio having received signal strength measurements reported by two WAPs can be grouped based on which of the WAPs reported the stronger received signal strength measurement. More particularly, the operation to determine the level of radiated power by the Bluetooth radios having active Bluetooth connections with passenger devices, can include to identify groups of the Bluetooth radios. The operation to identify the groups of the Bluetooth radios sorts into one of the groups the Bluetooth radio identifiers which are identified in one of the reports associated with the received signal strength measurements by a respective one of the WAPs. The operation to identify the groups of the Bluetooth radios further sorts a Bluetooth radio identifier identified in reports from two of the WAPs into only the group associated with one of the two WAPs that reported the stronger received signal measurement associated with the Bluetooth radio identifier. The centralized Bluetooth radio manager 220 can then separately control each of the groups of Bluetooth radios based on for each group, determining a level of radiated power collectively by the Bluetooth radios in the group and initiating operation to prevent establishment of new Bluetooth connections between the group of Bluetooth radios and other passenger devices responsive to the result of combining the reported signal strength measurements of the Bluetooth radios in the group satisfying the remedial action rule.

In still another embodiment, the centralized Bluetooth radio manager 220 can allocate which Bluetooth channels are allowed to be used by Bluetooth radios based on a zone dependent channel map, and may also possibly reduce and/or increase the number of Bluetooth channels allowed in each zone based on the level of radiated power by the Bluetooth radios in the zone. More particularly, the centralized Bluetooth radio manager 220 can operate to identify groups of the Bluetooth radios based on which are located within which of a plurality of spatial zones along the vehicle cabin, and obtain a channel map identifying which Bluetooth channels are permitted to be used by Bluetooth radios in which of the spatial zones, wherein the channel map does not permit adjacent spatial zones to use the same Bluetooth channel. The centralized Bluetooth radio manager 220 can then control the Bluetooth radios in different ones of the spatial zones to restrict their Bluetooth connections to using only Bluetooth channels permitted for the spatial zone in which the respective Bluetooth radio is located.

In a further implementation of this embodiment, the centralized Bluetooth radio manager 220 can operate to increase the number of Bluetooth channels identified by the channel map as permitted to be used by one of the spatial zones responsive to the level of radiated power by the Bluetooth radios in the spatial zone being less than a first threshold value defined by the remedial action rule. Conversely, the centralized Bluetooth radio manager 220 can operate to decrease the number of Bluetooth channels identified by the channel map as permitted to be used by the spatial zone responsive to the level of radiated power by the Bluetooth radios in the spatial zone being greater than a second threshold value defined by the remedial action rule. In this manner, the number of Bluetooth channels which permitted to be used in a zone can be dynamically adapted to maintain the level of radiated power in the zone near one or more threshold values.

Example Centralized Bluetooth Radio Manager

Figure 5:
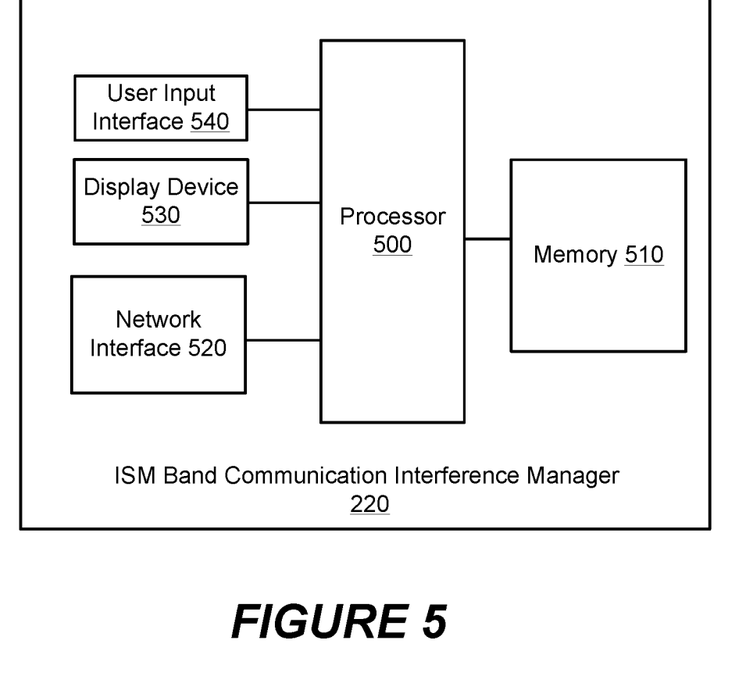
FIG. 5 is a block diagram of components of the centralized Bluetooth radio manager of FIGS. 1-4 which are configured to operate according to some embodiments of the present disclosure.

FIG. 5 is a block diagram of components of the centralized Bluetooth radio manager 220 of FIGS. 1-4 which are configured to operate in accordance with some embodiments of the present disclosure. The manager 220 includes a processor 500, a memory 510, and a network interface 520 which may include a wireless and/or a wired network communication (e.g., Ethernet) capability. When the network interface 520 is configured for wireless communication, it may include, but is not limited to, a Bluetooth transceiver, a WLAN transceiver (IEEE 802.11 A-D, IEEE 802.11 A-C, or other IEEE 802.11), a LTE or other cellular transceiver, or other RF communication transceiver configured to communicate with the SVDUs, Bluetooth radios located with the SVDUs, and the WAPs.

The processor 500 may include one or more data processing circuits, such as a general purpose and/or special purpose processor (e.g., microprocessor and/or digital signal processor) that may be collocated or distributed across one or more networks. The processor 500 is configured to execute computer program code in the memory 510, described below as a non-transitory computer readable medium, to perform at least some of the operations described herein as being performed by an access control computer. The computer program code when executed by the processor 500 causes the processor 500 to perform operations in accordance with one or more embodiments disclosed herein for the manager 220. The manager 220 may further include a user input interface 540 (e.g., touch screen, keyboard, keypad, etc.) and a display device 530.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A vehicle entertainment system comprising:
 a centralized Bluetooth radio manager communicatively connected to Bluetooth radios located with seat video display units (SVDU) at passenger seats within a vehicle cabin, the centralized Bluetooth radio manager comprising:
  a network interface that communicates with the Bluetooth radios through a vehicle cabin network;
  a processor coupled to the network interface; and
  a memory coupled to the processor and storing instructions that when executed by the processor causes the processor to perform operations comprising to:
   determine a level of radiated power by the Bluetooth radios having active Bluetooth connections with passenger devices; and
   control at least one group of the Bluetooth radios to prevent establishment of new Bluetooth connections between the group of Bluetooth radios and other passenger devices responsive to the determined level of radiated power satisfying a remedial action rule related to excessive Bluetooth interference.

2. The vehicle entertainment system of claim 1, wherein the operation to control at least one group of the Bluetooth radios to prevent establishment of new Bluetooth connections between the group of Bluetooth radios and other passenger devices responsive to the determined level of radiated power satisfying the remedial action rule related to excessive Bluetooth interference, comprises to:
control one of the at least one group of the Bluetooth radios to prevent completion of a pairing process between the group of the Bluetooth radios and any of the other passenger devices to prevent establishment of new Bluetooth connections.

3. The vehicle entertainment system of claim 1, wherein the operation to control at least one group of the Bluetooth radios to prevent establishment of new Bluetooth connections between the group of Bluetooth radios and other passenger devices responsive to the determined level of radiated power satisfying the remedial action rule related to excessive Bluetooth interference, comprises to:
for each of the Bluetooth radios in one of the at least one group, control the Bluetooth radio to cease periodic transmission of Bluetooth advertising packets containing an identifier of the Bluetooth radio to interfere with discovery of the Bluetooth radio by a passenger device.

4. The vehicle entertainment system of claim 1, wherein the operations further comprise to:
responsive to the determined level of radiated power for one of the least one group of the Bluetooth radios exceeding a threshold value defined by the remedial action rule, selecting Bluetooth radios having active Bluetooth connections with passenger devices that are to be terminated; and
controlling the selected Bluetooth radios to terminate their connections with the passenger devices.

5. The vehicle entertainment system of claim 4, wherein the operation to select Bluetooth radios having active Bluetooth connections with passenger devices that are to be terminated, further comprises to:
determine types of media traffic communicated through the active Bluetooth connections by respective Bluetooth radios; and
select the Bluetooth radios determined to be communicating a type of media traffic having a greater bit rate than another type of media traffic communicated by other Bluetooth radios.

6. The vehicle entertainment system of claim 5, wherein the types of media traffic which are determined comprise at least two of the following: passenger voice, audio streaming from the vehicle entertainment system to the Bluetooth connected passenger device, gaming data communicated from the Bluetooth radio to the Bluetooth connected passenger device, gaming data communicated from the Bluetooth connected passenger device to the Bluetooth radio, passenger input data communicated from the Bluetooth connected passenger device to the Bluetooth radio to control one of the SVDUs, and electronic book data.

7. The vehicle entertainment system of claim 4, wherein the operation to select Bluetooth radios having active Bluetooth connections with passenger devices that are to be terminated, further comprises to:
for each of the Bluetooth radios, determine an elapsed connection time since establishment of the active Bluetooth connection to a passenger device; and
prioritize the selection of Bluetooth radios, to have their active Bluetooth connections terminated, based on the which of the Bluetooth radios have longer elapsed connection times relative to other Bluetooth radios.

8. The vehicle entertainment system of claim 4, wherein the operation to select Bluetooth radios having active Bluetooth connections with passenger devices that are to be terminated, further comprises to:
for each of the Bluetooth radios, determine whether the Bluetooth radio has a Bluetooth connection to a passenger device that is identified as having prioritized Bluetooth access; and
prioritize the selection of Bluetooth radios, to have their active Bluetooth connections terminated, based on which of the Bluetooth radios are not determined to have prioritized Bluetooth access.

9. The vehicle entertainment system of claim 4, wherein the operation to prioritize the selection of Bluetooth radios, to have their active Bluetooth connections terminated, based on which of the Bluetooth radios are not determined to have prioritized Bluetooth access, further comprises to:
for each of the Bluetooth radios, attempt to identify an application hosted on a passenger device that is Bluetooth connected to the Bluetooth radio and is a source or destination of traffic communicated between the Bluetooth radio and the passenger device; and
prioritize the selection of Bluetooth radios, to have their active Bluetooth connections terminated, based on the identified applications hosted on the passenger devices respectively connected to the Bluetooth radios.

10. The vehicle entertainment system of claim 1, wherein the operations further comprise to:
responsive to the determined level of radiated power for one of the least one group of the Bluetooth radios exceeding a threshold value defined by the remedial action rule, selecting Bluetooth radios having active Bluetooth connections with passenger devices; and
controlling the selected Bluetooth radios to reduce bit rate of traffic communicated through their connections with the passenger devices.

11. The vehicle entertainment system of claim 1, wherein the operation to determine the level of radiated power by the Bluetooth radios having active Bluetooth connections with passenger devices, comprises to:
receive measurement reports from WiFi access points spaced apart within the vehicle cabin, wherein the WiFi access points include locally integrated Bluetooth radios that count active Bluetooth connections between the Bluetooth radios and passenger devices and indicate the count in the measurement reports; and
determine the level of radiated power by the Bluetooth radios in active Bluetooth connections with passenger devices based on the counts indicated by the measurement reports from the WiFi access points.

12. The vehicle entertainment system of claim 1, wherein the operation to determine the level of radiated power by the Bluetooth radios having active Bluetooth connections with passenger devices, comprises to:
receive signal strength measurement reports from WiFi access points spaced apart within the vehicle cabin, wherein the WiFi access points include locally integrated Bluetooth radios that measure received signal strength from the Bluetooth radios; and
determine the level of radiated power by the Bluetooth radios in active Bluetooth connections with passenger devices based on an algorithmic combination of the signal strength measurements indicated by the received signal strength measurement reports from the Bluetooth radios located integrated in the WiFi access points.

13. The vehicle entertainment system of claim 12,
wherein the operation to determine the level of radiated power by the Bluetooth radios having active Bluetooth connections with passenger devices, comprises to:
identify groups of the Bluetooth radios based on which Bluetooth radios are located within which of a plurality of spatial zones in the vehicle cabin, and
wherein the operation to control at least one group of the Bluetooth radios to prevent establishment of new Bluetooth connections between the group of Bluetooth radios and other passenger devices responsive to the determined level of radiated power satisfying the remedial action rule related to excessive Bluetooth interference, comprises to:
separately control each of the groups of Bluetooth radios based on for each group, determining a level of radiated power collectively by the Bluetooth radios in the group and initiating operation to prevent establishment of new Bluetooth connections between the group of Bluetooth radios and other passenger devices responsive to the result of combining the reported signal strength measurements of the Bluetooth radios in the group satisfying the remedial action rule.

14. The vehicle entertainment system of claim 12,
wherein the operation to determine the level of radiated power by the Bluetooth radios having active Bluetooth connections with passenger devices, comprises to:
identify groups of the Bluetooth radios, wherein the operation to identify the groups of the Bluetooth radios sorts into one of the groups the Bluetooth radio identifiers which are identified in one of the reports associated with the received signal strength measurements by a respective one of the WiFi access points, wherein the operation to identify the groups of the Bluetooth radios further sorts a Bluetooth radio identifier identified in reports from two of the WiFi access points into only the group associated with one of the two WiFi access point that reported the stronger received signal measurement associated with the Bluetooth radio identifier, and
wherein the operation to control at least one group of the Bluetooth radios to prevent establishment of new Bluetooth connections between the group of Bluetooth radios and other passenger devices responsive to the determined level of radiated power satisfying the remedial action rule related to excessive Bluetooth interference, comprises to:
separately control each of the groups of Bluetooth radios based on for each group, determining a level of radiated power collectively by the Bluetooth radios in the group and initiating operation to prevent establishment of new Bluetooth connections between the group of Bluetooth radios and other passenger devices responsive to the result of combining the reported signal strength measurements of the Bluetooth radios in the group satisfying the remedial action rule.

15. The vehicle entertainment system of claim 1, wherein the operations further comprise to:
identify groups of the Bluetooth radios based on which are located within which of a plurality of spatial zones along the vehicle cabin;
obtain a channel map identifying which Bluetooth channels are permitted to be used by Bluetooth radios in which of the spatial zones, wherein the channel map does not permit adjacent spatial zones to use the same Bluetooth channel; and
control the Bluetooth radios in different ones of the spatial zones to restrict their Bluetooth connections to using only Bluetooth channels permitted for the spatial zone in which the respective Bluetooth radio is located.

16. The vehicle entertainment system of claim 15, wherein the operations further comprise to:
increase the number of Bluetooth channels identified by the channel map as permitted to be used by one of the spatial zones responsive to the level of radiated power by the Bluetooth radios in the spatial zone being less than a first threshold value defined by the remedial action rule; and
decrease the number of Bluetooth channels identified by the channel map as permitted to be used by the spatial zone responsive to the level of radiated power by the Bluetooth radios in the spatial zone being greater than a second threshold value defined by the remedial action rule.

17. A centralized Bluetooth radio manager communicatively connected to Bluetooth radios located with display units (DU) operable to display information to users, the centralized Bluetooth radio manager comprising:
a network interface that communicates with the Bluetooth radios through a network;
a processor coupled to the network interface; and
a memory coupled to the processor and storing instructions that when executed by the processor causes the processor to perform operations comprising to:
determine a level of radiated power by the Bluetooth radios having active Bluetooth connections with user devices; and
control at least one group of the Bluetooth radios to prevent establishment of new Bluetooth connections between the group of Bluetooth radios and other user devices responsive to the determined level of radiated power satisfying a remedial action rule related to excessive Bluetooth interference.

18. The centralized Bluetooth radio manager of claim 17, wherein the operation to control at least one group of the Bluetooth radios to prevent establishment of new Bluetooth connections between the group of Bluetooth radios and other user devices responsive to the determined level of radiated power satisfying the remedial action rule related to excessive Bluetooth interference, comprises to:
control one of the at least one group of the Bluetooth radios to prevent completion of a pairing process between the group of the Bluetooth radios and any of the other user devices to prevent establishment of new Bluetooth connections.

19. The centralized Bluetooth radio manager of claim 17, wherein the operations further comprise to:
responsive to the determined level of radiated power for one of the least one group of the Bluetooth radios exceeding a threshold value defined by the remedial action rule, selecting Bluetooth radios having active Bluetooth connections with user devices that are to be terminated; and
controlling the selected Bluetooth radios to terminate their connections with the user devices.

20. The centralized Bluetooth radio manager of claim 17, wherein the operation to determine the level of radiated power by the Bluetooth radios having active Bluetooth connections with user devices, comprises to:

receive signal strength measurement reports from WiFi access points spaced apart, wherein the WiFi access points include locally integrated Bluetooth radios that measure received signal strength from the Bluetooth radios; and determine the level of radiated power by the Bluetooth radios in active Bluetooth connections with user devices based on an algorithmic combination of the signal strength measurements indicated by the received signal strength measurement reports from the Bluetooth radios located integrated in the WiFi access points.

21. The centralized Bluetooth radio manager of claim 20, wherein the operation to determine the level of radiated power by the Bluetooth radios having active Bluetooth connections with passenger devices, comprises to:

identify groups of the Bluetooth radios based on which Bluetooth radios are located within which of a plurality of spatial zones in the vehicle cabin, and wherein the operation to control at least one group of the Bluetooth radios to prevent establishment of new Bluetooth connections between the group of Bluetooth radios and other passenger devices responsive to the determined level of radiated power satisfying the remedial action rule related to excessive Bluetooth interference, comprises to:

separately control each of the groups of Bluetooth radios based on for each group, determining a level of radiated power collectively by the Bluetooth radios in the group and initiating operation to prevent establishment of new Bluetooth connections between the group of Bluetooth radios and other passenger devices responsive to the result of combining the reported signal strength measurements of the Bluetooth radios in the group satisfying the remedial action rule.

22. The centralized Bluetooth radio manager of claim 17, wherein the operations further comprise to:

identify groups of the Bluetooth radios based on which are located within which of a plurality of spatial zones;

obtain a channel map identifying which Bluetooth channels are permitted to be used by Bluetooth radios in which of the spatial zones, wherein the channel map does not permit adjacent spatial zones to use the same Bluetooth channel; and control the Bluetooth radios in different ones of the spatial zones to restrict their Bluetooth connections to using only Bluetooth channels permitted for the spatial zones in which the respective Bluetooth radio is located.

23. The centralized Bluetooth radio manager of claim 22, wherein the operations further comprise to:

increase the number of Bluetooth channels identified by the channel map as permitted to be used by one of the spatial zones responsive to the level of radiated power by the Bluetooth radios in the spatial zones being less than a first threshold value defined by the remedial action rule; and decrease the number of Bluetooth channels identified by the channel map as permitted to be used by the spatial zone responsive to the level of radiated power by the Bluetooth radios in the spatial zone being greater than a second threshold value defined by the remedial action rule.

* * * * *